US009635113B2

(12) United States Patent
Chilukuri et al.

(10) Patent No.: US 9,635,113 B2
(45) Date of Patent: Apr. 25, 2017

(54) SOFTWARE AS A SERVICE FRAMEWORK FOR THE DIGITAL ENGAGEMENT AND CONCLUSION OF CLIENTS BY SERVICE PROFESSIONALS

(71) Applicant: Velawsity, LLC, Chicago, IL (US)

(72) Inventors: Raghu Chilukuri, Plainfield, IL (US); Aymeric Grassart, Chicago, IL (US); Karnig Kerkonian, Lincolnshire, IL (US); Harry Madanyan, Palos Heights, IL (US); Rudy Minasian, Chicago, IL (US); Thanadham Thaveesaengsiri, Scarsdale, NY (US); John Tran, Chicago, IL (US)

(73) Assignee: Velawsity, LLC, Chicago, IL (US)

( * ) Notice: Subject to any disclaimer, the term of this patent is extended or adjusted under 35 U.S.C. 154(b) by 215 days.

(21) Appl. No.: 14/732,642

(22) Filed: Jun. 5, 2015

(65) Prior Publication Data

US 2015/0358370 A1 Dec. 10, 2015

Related U.S. Application Data

(60) Provisional application No. 62/008,329, filed on Jun. 5, 2014.

(51) Int. Cl.
*G06F 3/00* (2006.01)
*H04L 29/08* (2006.01)
(Continued)

(52) U.S. Cl.
CPC ......... *H04L 67/141* (2013.01); *G06Q 10/101* (2013.01); *G06Q 10/103* (2013.01);
(Continued)

(58) Field of Classification Search
CPC ............................ G06Q 10/101; G06F 3/0482
(Continued)

(56) References Cited

U.S. PATENT DOCUMENTS

| 2004/0143444 A1* | 7/2004 | Opsitnick | G06Q 50/18 |
| | | | 705/311 |
| 2006/0247959 A1* | 11/2006 | Oden | G06Q 10/063 |
| | | | 705/7.14 |

(Continued)

Primary Examiner — William Titcomb
(74) Attorney, Agent, or Firm — Dickran James Nahikian

(57) ABSTRACT

The software-as-a-service (the "Service") is a web-based software product available to a service professional (an "SP") allowing such SP to digitally engage clients on matters using any device that can connect to the internet such as a laptop, smartphone, tablet or other web-enabled devices (Google glasses, web-enabled watches etc.) (the "Device"). SPs can also use the Service to collaborate with their clients on matters by communicating and sharing documents with them in private collaboration portals exclusive to a specific client matter which are accessible through the Service and created by the Service during the Service's digital engagement process.

The Service is presently directed to SPs such as lawyers for use in the digital engagement of, and collaboration with, their clients on client matters. However, the Service can be easily customized for use by other SPs—such as accountants, consultants, doctors, psychologists, dentists, contractors and others who perform services for clients, customers and/or patients—who would like to digitally secure terms of engagement, and subsequently communicate and share files, with their clients, customers and/or patients in a private digital collaboration portal.

7 Claims, 10 Drawing Sheets

(51) Int. Cl.
*G06Q 10/10* (2012.01)
*G06F 3/0482* (2013.01)

(52) U.S. Cl.
CPC ............ *H04L 67/12* (2013.01); *H04L 67/306* (2013.01); *G06F 3/0482* (2013.01)

(58) Field of Classification Search
USPC ........................................................ 715/753
See application file for complete search history.

(56) References Cited

U.S. PATENT DOCUMENTS

| | | | |
|---|---|---|---|
| 2010/0082691 A1* | 4/2010 | Jaster | G06F 17/30734 707/792 |
| 2010/0223157 A1* | 9/2010 | Kalsi | G06Q 30/06 705/26.1 |
| 2015/0073938 A1* | 3/2015 | Chuma | G06Q 30/0214 705/26.41 |
| 2016/0224460 A1* | 8/2016 | Bryant | G06F 8/61 |
| 2016/0261711 A1* | 9/2016 | Blum | H04L 47/783 |

* cited by examiner

SOFTWARE AS A SERVICE FRAMEWORK FOR THE DIGITAL ENGAGEMENT AND CONCLUSION OF CLIENTS BY SERVICE PROFESSIONALS

CROSS-REFERENCE TO RELATED APPLICATIONS

This application claims the benefit of U.S. Provisional No. 62/008,3290 filed Jun. 5, 2014, the disclosure of which is incorporated herein by reference in its entirety.

FIELD OF INVENTION

The present invention relates generally to service professionals and their clients or customers forming, maintaining and terminating relationships for the provision of services and the establishment of channels and repositories for communicating information between any service professional ("SP") or groups of SPs and any client or groups of clients. More particularly, the invention relates to software-as-a-service ("Service") comprising a web-based systems and methods available to a service professional enabling any such SP to digitally engage clients on matters using any device that can connect to the internet such as a laptop, smartphone, tablet or other web-enabled devices, for example and without limitation Google glasses, web-enabled watches and the like ("Device"). SPs can also use the Service to collaborate with their clients on matters by communicating and sharing documents with them in private collaboration portals exclusive to a specific client matter which are accessible through the Service and created by the Service during the Service's digital engagement process.

The Service is preferably directed to SPs such as lawyers for use in the digital engagement of, and collaboration with, their clients on client matters. However, without departing from the scope of the instant invention the Service can be easily customized for use by other SPs—such as accountants, consultants, doctors, psychologists, dentists, contractors and others who perform services for clients, customers and/or patients—who would like to digitally secure terms of engagement, and subsequently communicate and share files, with their clients, customers and/or patients in a private digital collaboration portal.

BACKGROUND OF THE INVENTION

Prior art has concentrated on non-standardized, unsecured, unsynchronized, ad hoc and often chaotic client intake, conclusion, communications and project matter assignment as between the providers of professional services and their customers or clients. Typically, a prospective client contacts a SP with a request to provide services and then a series of communications ensues defining the professional relationship desired by these parties. The SP memorializes agreed-to scope, terms and conditions of the relationship by an agreement governing the retention of the SP and provision of the services to the client, usually this takes the form of a letter to be acknowledged or executed and exchanged by the parties. Support personnel assisting SPs and clients may introduce errors or other problems. Miscommunications, costs and penalties attach, for example delay in providing the desired services, under the prior art. It typically challenges both SPs and customers or clients to modify the scope, terms and conditions of the service provision as the professional relationship progresses over time. In the legal field for example, SPs such as attorneys may be exposed to liability for matters, tasks and projects the attorney believed were concluded or otherwise terminated where the client had reason to believe the representation was ongoing and the attorney failed to transmit proper notice regarding her impression the provision of professional services had ended. During the time leading up to and the period when services are provided, SPs and their clients typically communicate haphazardly via landline telephone, mobile telephone, email, SMS messaging, letters, couriers and postal mail. Some customers or clients may prefer certain communications means while others might prefer different means, and a SP may need to search through the separate means in volume to find important or time-sensitive information. The problematic issues arising from the various, separate modalities and functions have not been previously resolved, and the disadvantages of the prior art would be obvious to a SP having ordinary exposure in the pertinent field.

The advantages of the present invention can be readily observed by understanding the following brief description of the invention. The Service enables a SP to initiate the process of engaging a client digitally by creating a client from any web-enabled device. The SP then may create a digital matter record for the client. Once the SP has created the client and has created the matter for such client, the SP may select the terms of the prospective engagement and then is enabled to prompt the Service to send an engagement letter to the client digitally regarding the matter. Upon the SP prompting the Service to engage a client in a particular matter, the Service sends a responsive and/or actionable HTML engagement letter to the client. Upon the client's receipt of the electronic message comprised of the responsive and/or actionable HTML engagement letter, the client is enabled to accept the engagement letter merely by clicking and/or selecting a consent and/or acceptance button ("Client Acceptance").

The Client Acceptance triggers the Service to initiate discrete processes contemporaneously or in close temporal proximity for the purposes of memorializing the acceptance, confirmation and/or ratification of the engagement—one of which is the creation of a private collaboration portal on the Service for the particular client matter for which there was Client Acceptance. In such private collaboration portal, the SP and client may digitally communicate and share documents with one another.

If the SP determines that a client relationship or a matter should conclude or otherwise terminate, the SP may prompt the Service to conclude the matter. At such prompt, the Service initiates discrete processes to conclude the matter, and the invention restricts and/or limits further collaboration between the SP and the client in such matter on the Service and digitally memorializes the conclusion of the matter.

Clearly there is a need for distributed systems and methods to automatically enable engagement, matter generation, conclusion and communications facilities. The present invention addresses each concern above and it provides numerous advantages, including those set forth below.

SUMMARY OF THE INVENTION

An advantage of the present invention is that it enables a prospective client to engage a SP without any requirement of physical document exchange.

Another advantage of the present invention is that no support personnel need be interposed between a SP and client or customer thereby preventing the potential introduction of errors, delays or other sources of problems by such personnel.

Another advantage of the present invention is that it is not platform-specific and thus may be ported across practically any distributed computing platform and network.

Another advantage of the present invention is that it automatically associates professional relationships and matters and opens a single, secure source for information sharing.

Another advantage of the present invention is that it enables relationship, matter and document tracking and management in addition to convenient modification of the scope, terms and conditions governing a professional services relationship over time and without the need for paper.

In a preferred embodiment of the present invention, the invention is made available to SPs and clients via web browser through Software as a Service hosted on a Platform as a Service model provided by Microsoft Corporation. The systems and methods in this embodiment exist in the .Net framework, are architected utilizing the model-view-controller paradigm, and are rendered in the C# programming language and Angular JS. In this particular embodiment, the web server is Internet Information Services. The pertinent records and other information contributed are stored in the form of cloud databases on a SQL server backend, and such are viewable in the form of HTML and/or PDF files. The mobile aspect of the preferred embodiment is rendered in Bootstrap. It being generally understood that any suitable client-server distributed computing arrangement, delivery model, framework, paradigm, programming languages, scripts, client, server, digital device, database, mobile aspect, messaging format, portal, and machine or human readable file formats may be utilized without departing from the invention disclosed herein.

The above and other objects, advantages, and novel features of the invention will be more fully understood from the following detailed description and the accompanying drawings, in which:

BRIEF DESCRIPTION OF THE DRAWINGS

Various objects and advantages of this invention will become apparent from all disclosures herein including the description that follows taken in relation to the accompanying drawings wherein are set forth, by way of illustration and example, certain embodiments of this invention. The drawings constitute a part of this disclosure, include exemplary embodiments of the present invention, and illustrate various objects and features thereof.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
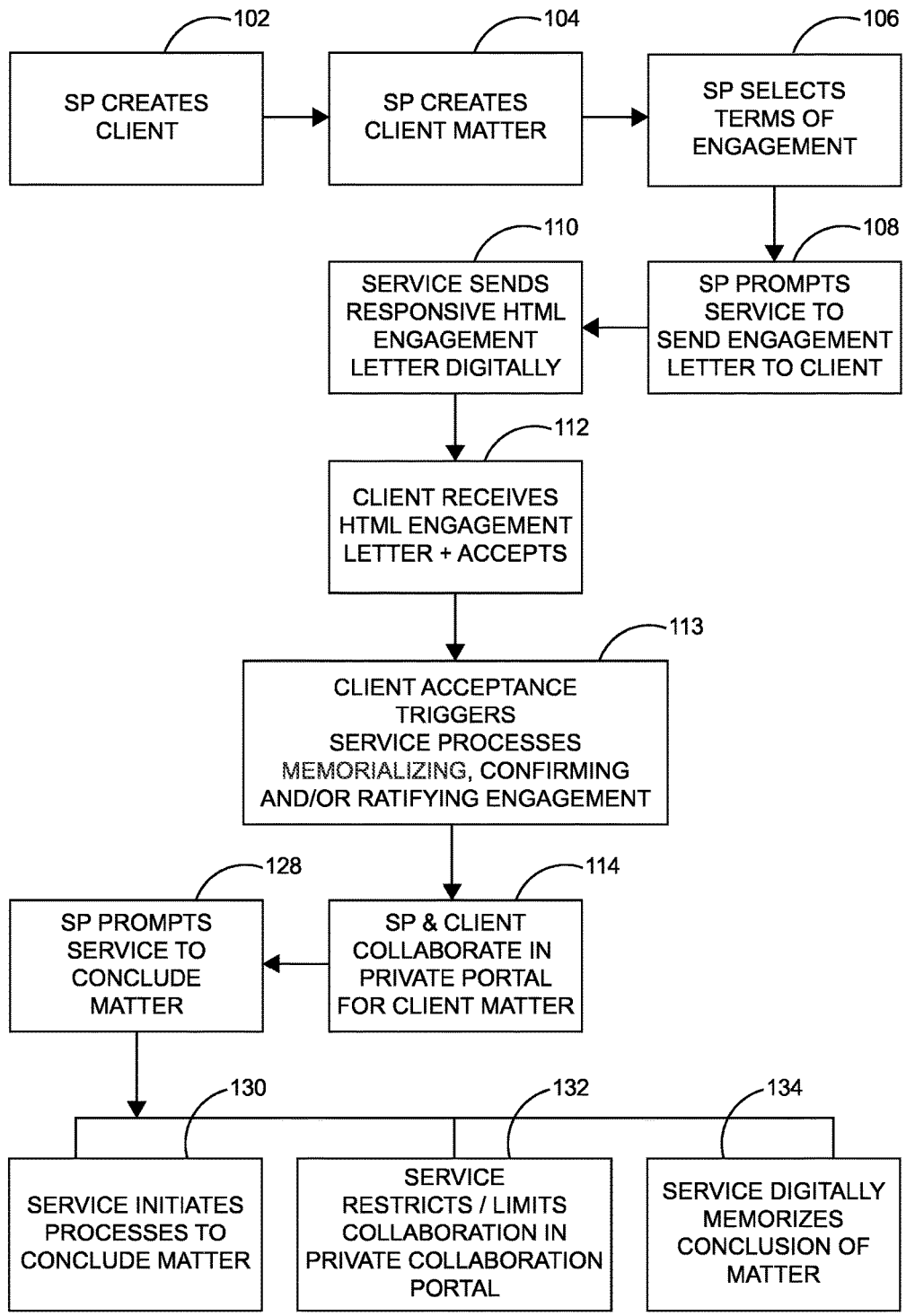
FIG. 1 depicts a block diagram of an example systems and methods for providing software as a service framework for the digital engagement and conclusion of clients by service professionals.

As shown in FIG. 1, the Service allows an SP to begin the process of engaging a client digitally by 102 creating a client from any web-enabled device. The SP then 104 may create a matter record for the client. Once the SP 102 has created the client and 104 has created the matter for such client, the SP 106 may select the terms of the prospective engagement and then 108 may prompt the Service to send an engagement letter to the client digitally regarding the matter.

Upon the SP 108 prompting the Service to engage a client in a particular matter, the Service 110 sends a responsive and/or actionable HTML engagement letter to the client. Upon the client's receipt of the electronic message comprised of the responsive and/or actionable HTML engagement letter, the client 112 may accept the engagement letter by clicking and/or selecting a consent and/or acceptance button ("Client Acceptance").

The Client Acceptance 113 triggers the Service to initiate certain processes contemporaneously or in close temporal proximity for the purposes of memorializing the acceptance, confirmation and/or ratification of the engagement—one of which is the creation of a private collaboration portal on the Service for the particular client matter for which there was Client Acceptance. In such private collaboration portal, the SP and client 114 may digitally communicate and share documents with one another.

If the SP determines that the client matter should conclude, the SP 128 may prompt the Service to conclude the matter. At such prompt, the Service 130 initiates certain processes to conclude the matter, 132 restricts and/or limits further collaboration between the SP and the client in such matter on the Service and 134 digitally memorializes the conclusion of the matter.

Figure 2:
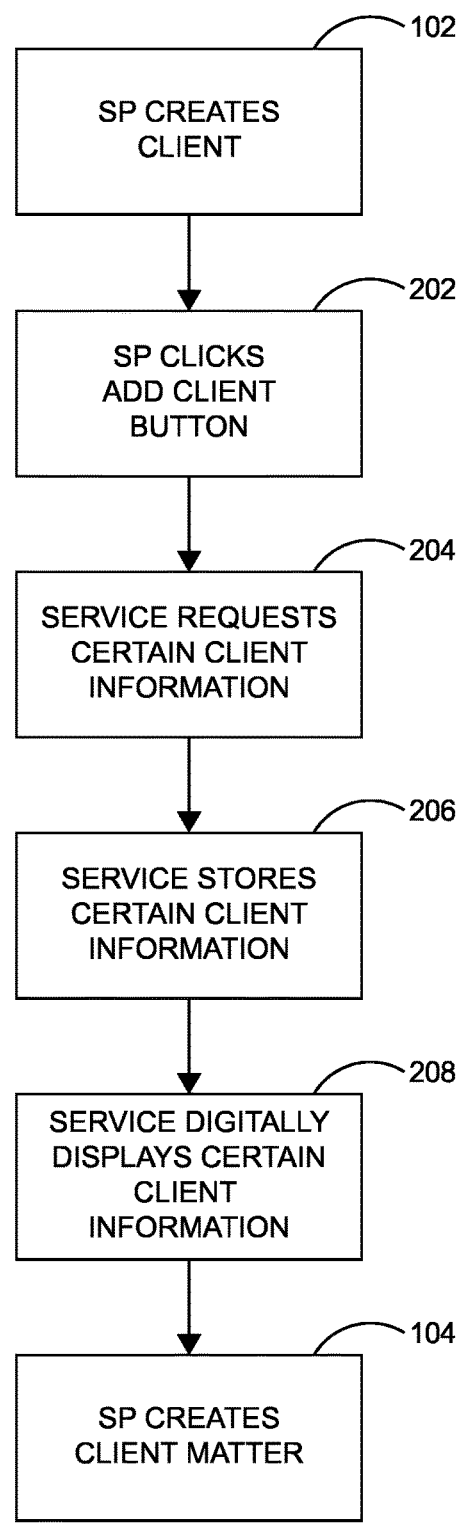
FIG. 2 depicts a block diagram of a SP creating a client on the Service.

As shown in FIG. 2, the SP 102 may create a client on the Service. To do so, the SP 202 clicks and/or selects an add client button. Upon doing so, the Service 204 requests the SP to provide the Service certain relevant information regarding the client such as name, contact information and other information. When the SP furnishes such client information, the Service 206 stores such client information and 208 digitally displays such client information to the SP on the Service. The SP 104 may then create a matter for such client.

Figure 3:
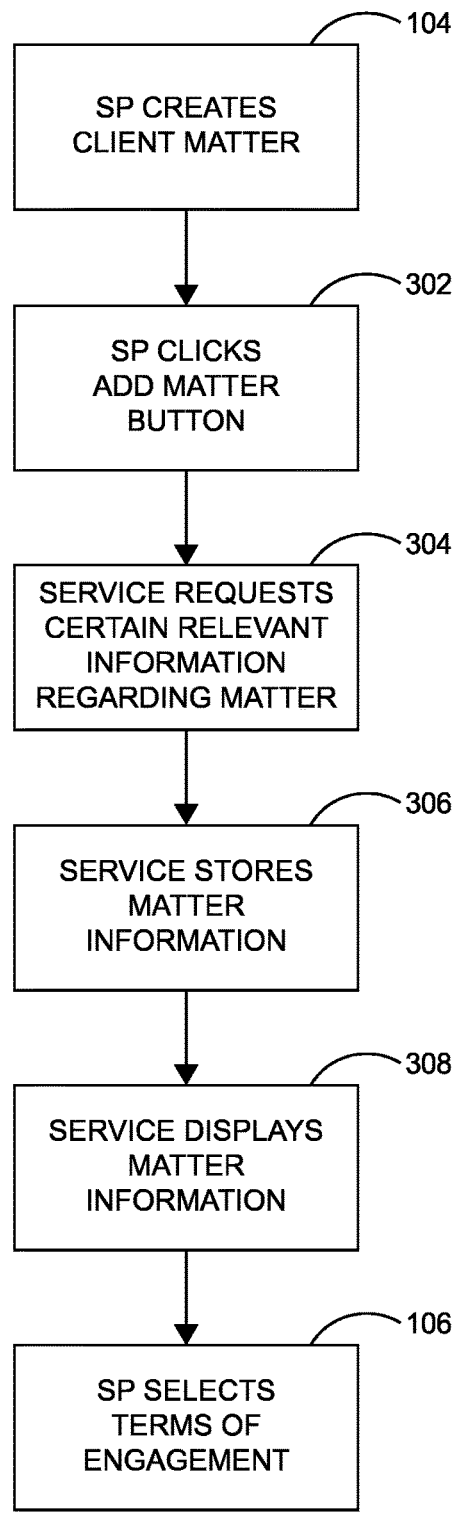
FIG. 3 depicts a block diagram of a SP creating a matter for a client.

As shown in FIG. 3, the SP 104 may choose to create a matter for the client on the Service. To do so, the SP 302 clicks and/or selects an add matter button. Upon doing so, the Service 304 requests the SP to provide the Service certain relevant information regarding the matter. When the SP furnishes such matter information, the Service 306 stores such information and 308 digitally displays such matter information to the SP on the Service. Thereafter, the SP 106 may select the terms of the prospective engagement of the client for such matter.

Figure 4:
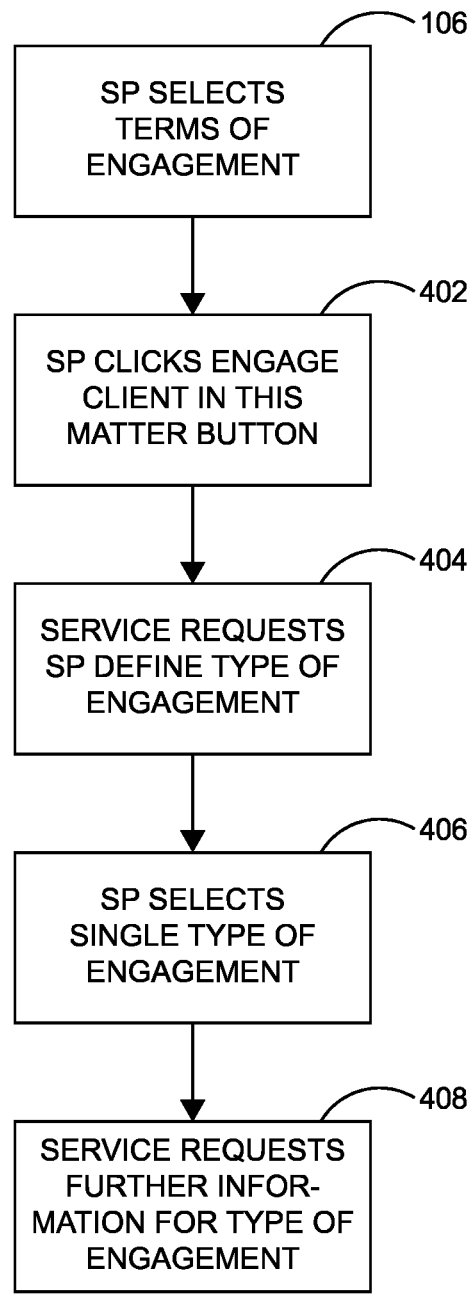
FIG. 4 depicts a block diagram of a SP providing particular terms of engagement for a matter.

As shown in FIG. 4, the SP 106 may select the terms of the prospective engagement of the client in the matter. To do so, the SP 402 clicks and/or selects an engage client in this matter button displayed in proximity to the matter information on the Service. Upon doing so, the Service 404 requests that the SP define the type of engagement desired from a number of options. The SP 406 selects a specific type of engagement from the choices. Thereafter, the Service 408 requests further information relevant to the specific type of engagement selected by the SP.

Figure 5:
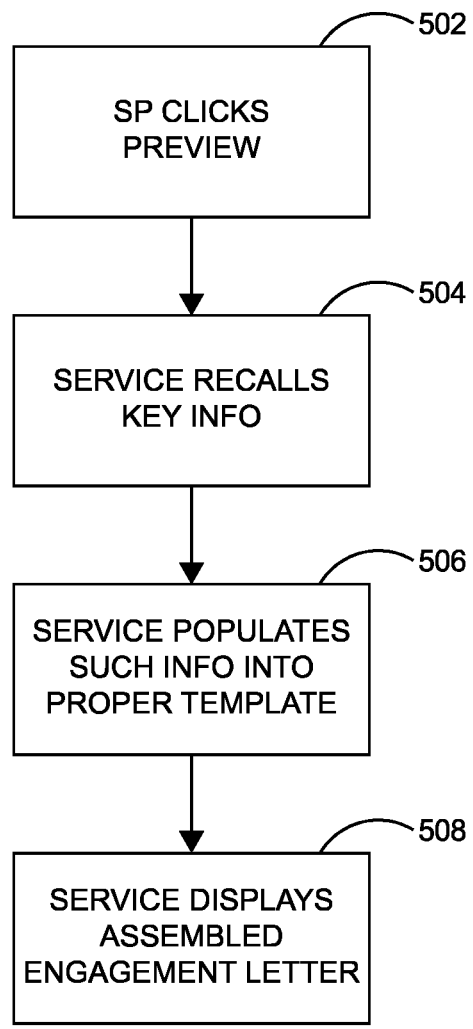
FIG. 5 depicts a block diagram of the Service generating an appropriate engagement letter.

As shown in FIG. 5, and once the SP has furnished the information requested by the Service in 406 and 408, the SP 502 may click and/or select a preview letter button to preview the engagement letter. To generate the preview, the Service 504 recalls the information the SP furnished in 102, 104 and 106; then 506 populates such information into a template corresponding to the type of engagement selected by the SP; and then 508 displays the assembled engagement letter digitally to the SP on the Service.

Figure 6:
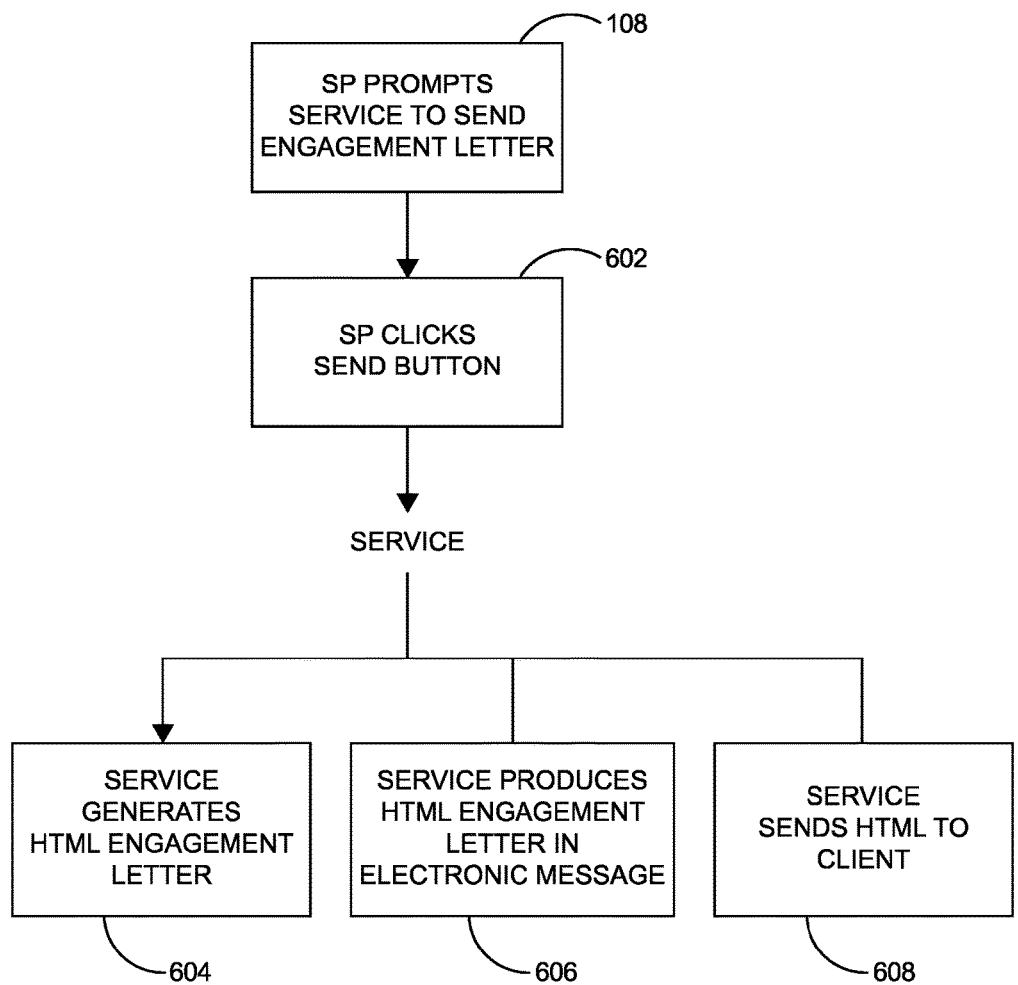
FIG. 6 depicts a block diagram of the Service transmitting an engagement letter to a client.

As shown in FIG. 6, the SP 108 may prompt the Service to digitally send the engagement letter to the client. To do so, the SP 602 clicks and/or selects a send button which triggers certain Service processes. The Service 604 generates a responsive and/or actionable HTML engagement letter, it 606 produces such HTML engagement letter in the body of an electronic message and it 608 sends such electronic message comprised of such HTML engagement letter to the client.

Figure 7:
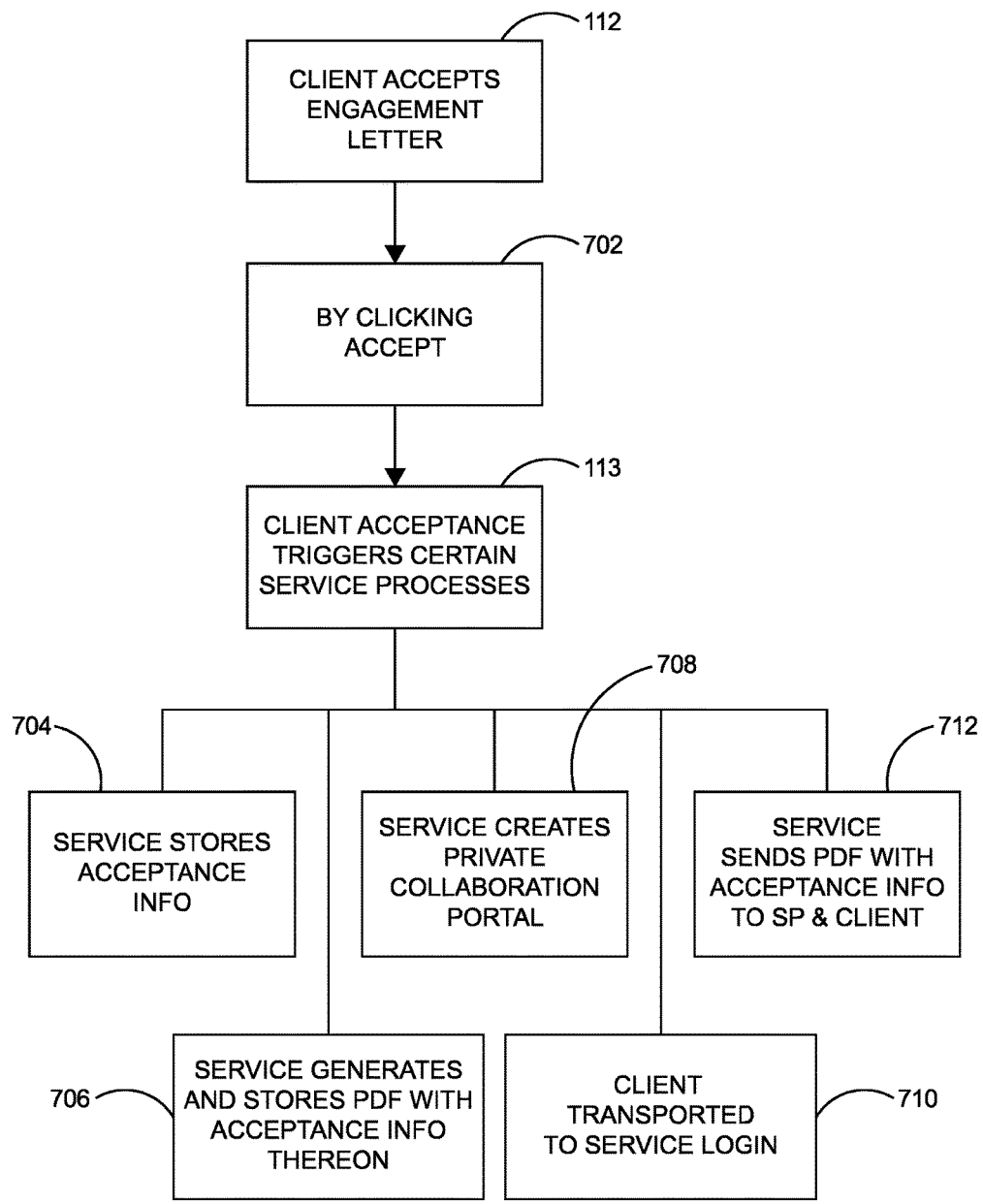
FIG. 7 depicts a block diagram of a client acceptance and the Service processes upon client acceptance.

As shown in FIG. 7, the client 112 may accept the terms contained in the engagement letter. To do so, the client 702 clicks and and/or selects a consent and/or acceptance button ("Client Acceptance"). The Client Acceptance 113 triggers the Service to initiate certain processes contemporaneously or in close temporal proximity which may memorialize the confirmation and ratification of the engagement:

The Service 704 stores the date, time and IP address of Client Acceptance.

The Service 706 generates and store a PDF of the HTML engagement letter with the date, time and IP address of Client Acceptance marked thereon.

The Service 708 creates a private collaboration portal on the Service for the client matter, accessible to the SP and the client, and makes such PDF accessible in the private collaboration portal.

The Service 710 transports the client to a login from which the client may be able to log into the Service and enter the private collaboration portal for that client matter.

The Service 712 digitally sends the PDF of the HTML engagement letter with the date, time and IP address of Client Acceptance marked thereon to the SP and the client.

Figure 8:
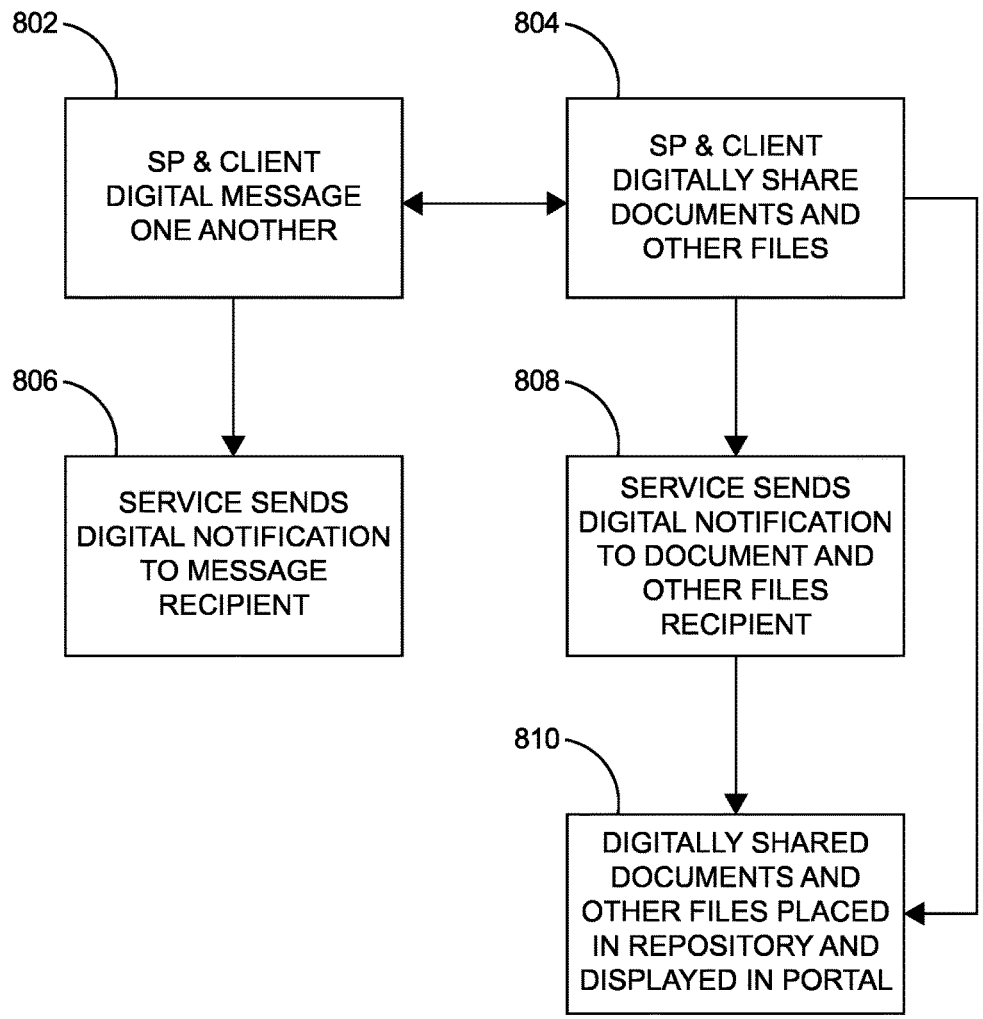
FIG. 8 depicts a block diagram of a private collaboration portal and notifications.

As shown in FIG. 8, in the private collaboration portal, the SP and the client 802 may digitally message one another and 804 may digitally share documents and other files. When one of the participants (the SP or the client) sends a message to the other, the Service 806 sends a digital notification to the other participant without disclosing the content of such message. When one of the participants (the SP or the client) shares a document and/or file with the other, the Service 808 sends a digital notification to the other participant without disclosing the content of such document and/or file.

Furthermore, when a participant sends a document and/or other file to another participant, the Service 810 also places such document and/or file in a document repository displayed in such private collaboration portal.

Figure 9:
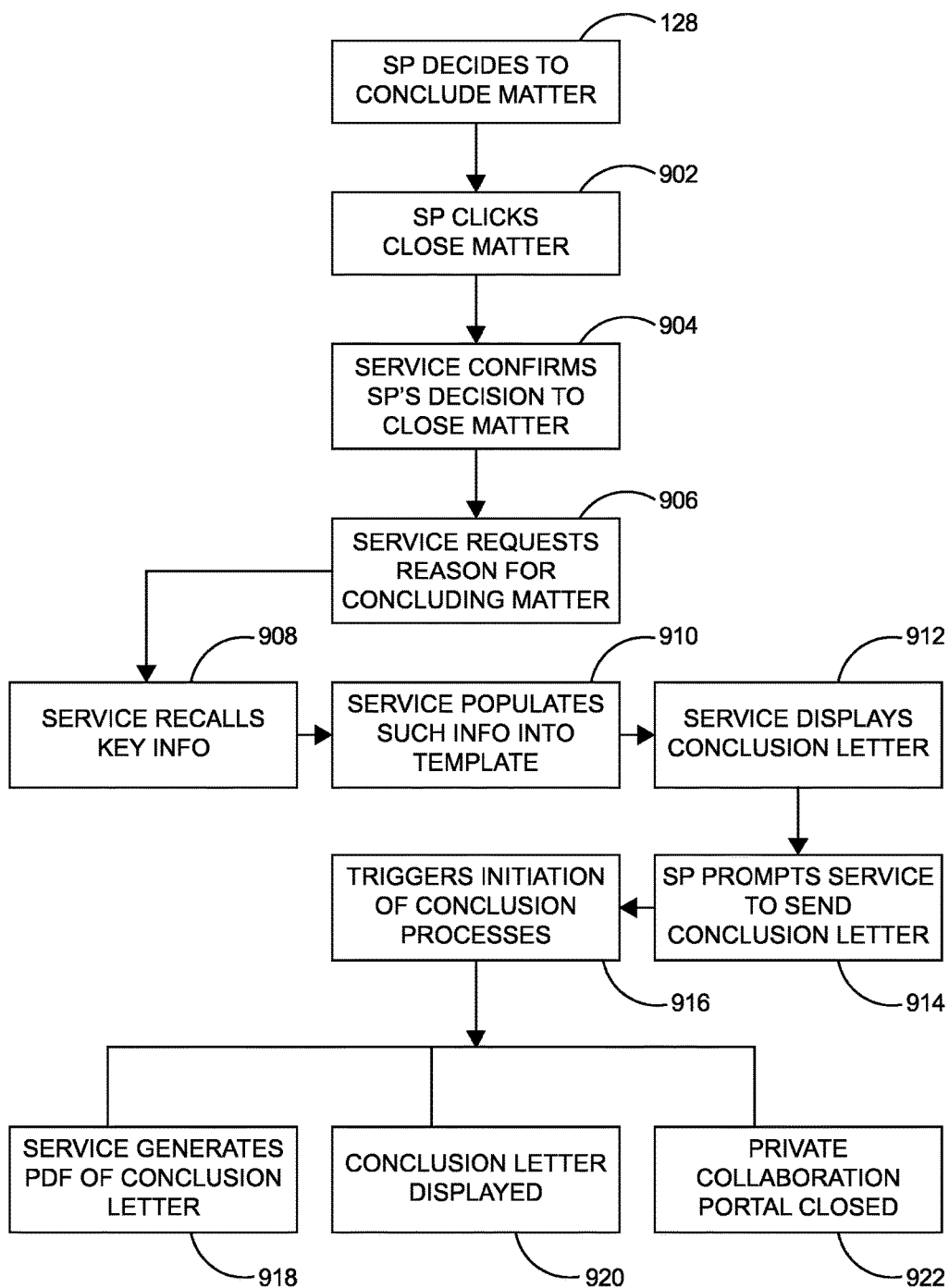
FIG. 9 depicts a block diagram of a SP closing a matter and concluding an engagement.

As shown in FIG. 9, the SP 128 may conclude the matter. To do so, the SP 902 clicks and/or selects a close matter button displayed on the Service in proximity to the matter information. Upon doing so, the Service 904 confirms the SP's decision to conclude the matter and 906 requests that the SP select the reason for closing the matter from a number of options.

When the SP has so confirmed and selected, the Service 908 recalls the information the SP furnished in 102, 104 and 906; then 910 populates such information into a template corresponding to the reason selected by the SP for concluding the matter; and then 912 displays the assembled conclusion letter digitally to the SP on the Service.

Once the conclusion letter is generated by the Service, the SP 914 may prompt the Service to send the conclusion letter to the client. To do so, the SP clicks and/or selects a send button. Clicking and/or selecting the send button 916 triggers the Service to initiate certain processes contemporaneously or in close temporal proximity which may memorialize the conclusion of the engagement:

The Service 918 generates an HTML and/or PDF of the conclusion letter.

The Service 920 displays a PDF of the generated conclusion letter in the private collaboration portal for such client matter.

The Service 922 closes the private collaboration portal and prevents and/or limits further collaboration in the same. While further collaboration may be prevented and/or limited upon the closing of the private collaboration portal, both the SP and the client may still access the information contained therein.

Figure 10:
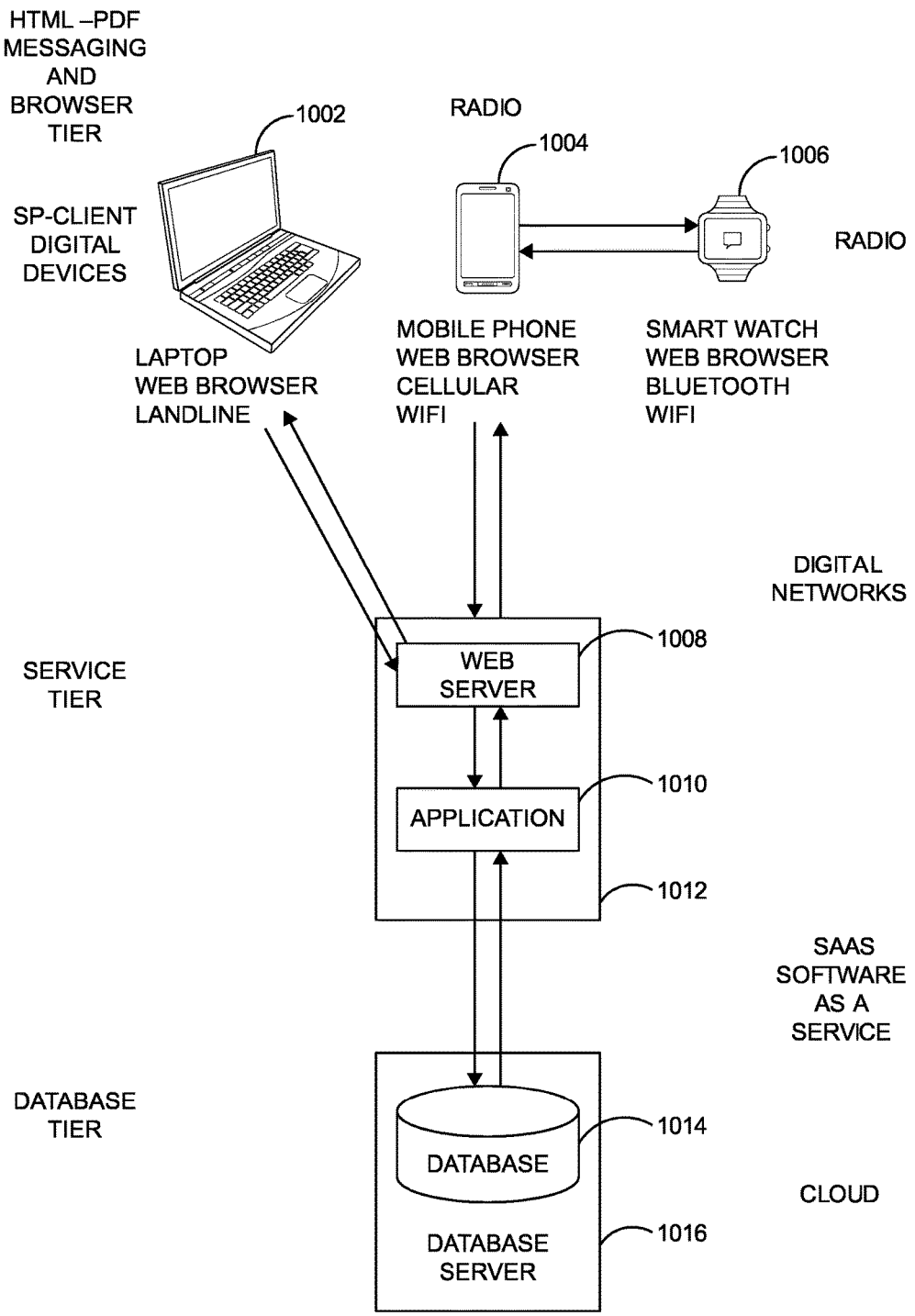
FIG. 10 depicts general-purpose computers to support the embodiments of the computer-implemented systems and methods including computer components disclosed in this application.

FIG. 10 shows an exemplary embodiment with general purpose computers and digital networks to support the embodiments of the computer-implemented systems and methods disclosed herein. In a particular configuration, a computer may be a computer server, a desktop computer, a laptop computer, a smartphone, a smartwatch or other digital device known to those skilled in the art. A computer will be electrically powered and may be connected to the web via cable, light or radio means. A computer includes an operating system such as iOS, Android or Microsoft Windows and typically a TCP/IP protocol stack for networking, as known to those skilled in the art. A computer may run software applications architected model-view-controller, be secure and enable private collaboration portals. A SP or client interfaces through her digital device via a web browser, such as Google Chrome, and/or an email client, such as Microsoft Outlook and she is enabled to exchange and access digital messages and digital files with them.

From the foregoing, it will be observed that numerous variations and modifications may be effected without departing from the spirit and scope of the invention. It is to be understood that no limitation with respect to the specific apparatus herein is intended or should be inferred. It is, of course, intended to cover by the appended claims all such modifications as fall within the scope of the claims.

What is claimed is:

1. A distributed computer-implemented system for providing a client engagement, conclusion and information-sharing platform to assist a service provider and a client in the creation, termination and management of their professional relationship, the system comprising:

a data storage to store a client database, wherein information pertaining to a client is stored in the client database;

one or more servers comprise one or more software applications and one or more processors, the one or more processors running a software application, the one or more processors configured to execute computer program steps, the steps comprising:

creating a client instance;

creating a matter instance pertaining to said client instance;

contributing particular terms of engagement for said matter instance;

generating an engagement letter;

transmitting said engagement letter;

accepting said engagement letter; and creating a private collaboration portal for said matter accessible to said service provider and said client; and one or more digital devices connected through a computer network to said one or more servers.

2. The distributed computer-implemented system of claim 1 wherein the steps further comprise clicking on a close matter button, requesting a reason for concluding said matter, finding stored information pertaining to said matter, populating a template with said information, displaying a conclusion letter, transmitting said conclusion letter, and closing said private collaboration portal.

3. The distributed computer-implemented system of claim 1 wherein the steps further comprise transmitting digital notice of a message between said service professional and said client wherein the content of said message is not disclosed in said digital notice.

4. The distributed computer-implemented system of claim 1 wherein the steps further comprise transmitting digital notice of a document or a file between said service professional and said client wherein the content of said document or said file is not disclosed in said digital notice.

5. A method for providing a client engagement platform to assist a service professional and a client in the creation, termination and management of their professional relationship comprising:

creating a client instance;

creating a matter instance pertaining to said client instance;

contributing particular terms of engagement for said matter instance;

storing information pertaining to said client instance, said matter instance and said particular terms of engagement for said matter instance remotely;

generating an engagement letter;

transmitting said engagement letter;

accepting said engagement letter by means of a web browser; and creating a private collaboration portal for said matter accessible to said service provider and said client through a computer network.

6. The method of claim 5 wherein the step of accepting said engagement letter triggers the further steps memorializing, confirming and ratifying engagement of said service professional by said client.

7. The method of claim 5 wherein said private collaboration portal displays shared documents and files stored in a database pertaining to said client and said matter.

* * * * *